United States Patent
Ihara et al.

[11] Patent Number: 6,117,363
[45] Date of Patent: Sep. 12, 2000

[54] METHOD FOR PRODUCING LIGHT-EMITTING MATERIAL

[75] Inventors: Masaru Ihara; Katsutoshi Ohno, both of Kanagawa; Mamoru Sennna, Tokyo; Tetsuhiki Isobe, Kanagawa; Takahiro Igarashi, Tokyo, all of Japan

[73] Assignee: Sony Corporation, Japan

[21] Appl. No.: 09/037,685

[22] Filed: Mar. 10, 1998

[30] Foreign Application Priority Data

Mar. 10, 1997 [JP] Japan .................................... 9-055104
Aug. 6, 1997 [JP] Japan .................................... 9-212171

[51] Int. Cl.[7] .......................... C09K 11/02; C09K 11/56; C09K 11/54; C09K 11/55
[52] U.S. Cl. .................. 252/301.65; 252/301.36; 252/301.6 R; 252/301.45; 252/301.4 R; 423/566.1
[58] Field of Search .............. 252/301.65, 301.36, 252/301.6 R, 301.4 R, 301.45; 423/566.1

[56] References Cited

U.S. PATENT DOCUMENTS 3,028,339  4/1962  Inoue et al. ................... 252/301.6 S
3,440,471  4/1969  Baczewski et al. ............... 252/301.36
3,565,815  2/1971  Christy ........................ 252/301.36
3,706,673  12/1972  Wainer ......................... 252/301.6 S
5,575,959  11/1996  Harris et al. .................. 423/566.1

FOREIGN PATENT DOCUMENTS

53-82682  7/1978  Japan ............................. 252/301.6 S
1071062  6/1967  United Kingdom ............... 252/301.6 S

*Primary Examiner*—C. Melissa Koslow
*Attorney, Agent, or Firm*—Ronald P. Kananen; Rader, Fishman & Grauer

[57] ABSTRACT

There is provided a novel method for manufacturing a light-emitting material composed of II–VI group semiconductors having a nano structure crystal and which is optimally doped with an activator. In a manufacturing method for the light-emitting material, a II–VI group semiconductor doped with an activator by a liquid phase reaction having a co-precipitation product is formed and an organic acid is added to the liquid phase reaction system. In another manufacturing method for the light-emitting material, a II–VI group semiconductor doped with an activator by a liquid phase reaction having a product co-precipitation is formed and a high molecular organic acid or polystyrene is added after the end of the liquid phase reaction.

26 Claims, 5 Drawing Sheets

METHOD FOR PRODUCING LIGHT-EMITTING MATERIAL

BACKGROUND OF THE INVENTION

1. Field of the invention

This invention relates to a method for manufacturing a light-emitting material and, more particularly, to a method for manufacturing a light-emitting material capable of excitation at a low voltage.

2. Description of Related Art

Recently, nano-structure crystals in II–VI group semiconductors, such as micro-sized crystals represented by Si or Ge or porous silicon, are stirring up interest because they exhibit specific optical properties. The term nano-structure crystals means crystal grains having a crystal grain size of the order of several nm and are generally termed nano-crystals.

Comparison of the II–VI group semiconductors having nano-structure crystals to those having bulk structure crystals reveals that the nano-structure crystals exhibit satisfactory light absorption and light emission characteristics. This is possibly ascribable to the fact that the II–VI group semiconductor exhibits the quantization size effect and hence the band gap of the nano-structure crystals is larger than that of the bulk structure crystals. That is, with the II–VI group semiconductors having the nano-structure crystals, it is believed that the band gap is possibly widened by the quantization size effect.

Meanwhile, in a display for e.g., a television receiver, a variety of phosphors are used. The phosphors currently used in a television display are synthesized by firing the starting material at an elevated temperature. The light-emitting materials, thus synthesized, are of a particle size of the order of several micrometers (3 to 10 $\mu$m). On the other hand, a thinner size of the television display is recently desired, such that there is an increasing interest in plasma display (PDP) which is a lightweight flat display, or an electroluminescence display (ELD).

With FED, to which particular attention is directed, the voltage of the electron beam needs to be lowered with decreasing thickness. However, if, with the display, thus reduced in thickness, the light-emitting materials with the particle size of the order of several $\mu$m are used, sufficient light emission is not achieved because of the low voltage. That is, with the display, thus reduced in thickness, the conventional phosphors cannot be excited sufficiently.

This is possibly due to the fact that, since the conventional phosphors are of a large crystal structure, the illuminated electron beam cannot reach the light-emitting portion of the phosphors. Specifically, the conventional phosphors, with the particle size of the order of several $\mu$m, cannot emit light sufficiently if used for a display with reduced thickness.

Among the phosphors emitting light at a low voltage, there is zinc oxide (ZnO:Zn) emitting green to blue light. Specifically, this ZnO:Zn is used in FED and can be excited at a low voltage of hundreds of volts to several thousands of volts. This ZnO:Zn is of a micro-sized crystal structure and electrically conductive such that it can emit light without charge-up even with a low voltage.

On the contrary, with the light-emitting materials having the nano crystal structure, the electron beam radiated at a low voltage can reach the light-emitting portion of the light-emitting materials. Thus, the light-emitting materials having the nano crystal structure can be used with advantage for the above-described display with the reduced thickness.

However, there is no other light-emitting material than the above-mentioned ZnO:Zn that is currently used as the light-emitting material capable of being excited at a low voltage. The manufacturing method for the II–VI group semiconductors having the nano crystal structure is not studied sufficiently such that a desired light-emitting material cannot be manufactured. Thus, there is a strong demand for a manufacturing method for a light-emitting material meritoriously used for a display with a reduced thickness.

On the other hand, the above-mentioned ZnO:Zn emits green to blue light, such that a II–VI group semiconductor emitting the other color light is desired as the light-emitting material. In addition, the II–VI group semiconductors having the nano crystal structure and which can be used with advantage not only for the FED but also with ELD and can emit light in various colors by the ultraviolet light are desired along with the manufacturing method for manufacturing these light-emitting materials.

SUMMARY OF THE INVENTION

It is therefore an object of the present invention to provide a method for manufacturing a totally new light-emitting material of II–VI group semiconductors having the nano crystal structure and which is satisfactorily doped with an activator.

For accomplishing the above object, the present inventors have conducted perseverant researches for finding conditions under which an activator can be optimally distributed when doping the II–VI group semiconductor with the activator during the liquid phase reaction. These researches led to a finding that the activator can be distributed more uniformly by adding an organic acid to the liquid phase reaction system, and to a finding that photoluminescence strength (PL strength) can be increased by supplying a high molecular organic acid after the end of the liquid phase reaction instead of adding the organic acid to the liquid phase reaction system.

In one aspect, the present invention provides a method for manufacturing a light-emitting material including forming a II–VI group semiconductor, doped with an activator, by a liquid phase reaction having a co-precipitation product, and adding an organic acid to the liquid phase reaction system during the liquid phase reaction.

In another aspect, the present invention provides a method for manufacturing a light-emitting material including forming a II–VI group semiconductor, doped with an activator, by a liquid phase reaction having a co-precipitation product, and adding a high molecular organic acid or polystyrene after the end of the liquid phase reaction.

In the above-described manufacturing method for a light-emitting material according to the present invention, the organic acid promotes ion exchange between the activator and the II–VI group semiconductor through solvent precipitation. With this technique, the II–VI group semiconductor is doped with an activator by the ion exchange. The activator can be distributed uniformly by addition of the organic acid. Thus, the activator is doped independently and in a uniformly dispersed state in the II–VI group semiconductor. Therefore, with this technique, a light-emitting material can be manufactured which has improved light emission characteristics.

With the second-stated manufacturing method for the light-emitting material according to the present invention, the added organic acid, high molecular organic acid or polystyrene is combined by chemical interaction with the II to VI group semiconductor. The organic acid, high molecular organic acid or polystyrene, thus added, can furnish energy to the II–VI group semiconductor doped with the activator. That is, with the light-emitting material manufactured by this technique, the organic acid, high molecular organic acid or polystyrene furnishes part of the energy required for light emission.

With the first-stated method according to the present invention, a light-emitting material having significantly improved light emission strength can be obtained by adding an organic acid to a liquid phase reaction system having a co-precipitation product during the liquid phase reaction.

With the second-stated method according to the present invention, a light-emitting material having significantly improved light emission strength can be obtained by adding a high molecular organic acid or polystyrene to a liquid phase reaction system having a co-precipitation product after the end of the liquid phase reaction.

Thus, it is possible with the present invention to manufacture a light-emitting material capable of emitting light by excitation even at a low voltage.

DESCRIPTION OF PREFERRED EMBODIMENTS

A method for manufacturing a light-emitting material according to the present invention is explained in detail.

The manufacturing method of the present invention for manufacturing a light-emitting material forms a II–VI group semiconductor doped with an activator by a liquid phase reaction having a co-precipitation product and adds an organic acid during the liquid phase reaction. Alternatively, the manufacturing method of the present invention for manufacturing a light-emitting material forms a II–VI group semiconductor doped with an activator by a liquid phase reaction having a co-precipitation product and, after the end of this liquid phase reaction, adds high molecular organic acid or polystyrene to the resulting product.

In the above-described technique of the present invention, the II–VI group semiconductors may be enumerated by zinc sulfide (ZnS), cadmium sulfide (CdS) and zinc selenide (ZnSe).

The activators may be enumerated by, for example, manganese (Mn). If ZnS, among the II–VI group semiconductors, is doped with this activator, light emission characteristics proper to the II–VI group semiconductors can be imparted to the resulting material. Specifically, Mn shows orange-colored light emission and after-glow. Also, if doped to CdS in place of to ZnS, this activator shows light emission and after-glow shifted towards the long wavelength side. In the following description, the ZnS semiconductor doped with Mn is termed 'ZnS:Mn'.

Also, if ZnS is doped with a combination of copper Cu, aluminum Al, silver Ag and Chlorine Cl as an activator, light emission characteristics proper to the respective elements can be imparted to ZnS. Specifically, Cu and Al exhibit green light emission and afterglow, Cu and Cl also exhibit green light emission and afterglow, Ag and Al exhibit blue light emission and afterglow and Ag and Cl also exhibit blue light emission and afterglow. In the following description, the ZnS semiconductor doped with Cu and Al is indicated as 'ZnS:Cu, Al'.

Also, the above ZnS may also be doped with terbium Tb, thulium Tm, europium Eu or fluorine F, as an activator, either as an element or a compound, for manifesting light emission characteristics proper to the respective elements or compounds. Specifically, Tb or $TbF_3$ exhibits green light emission and afterglow, Tm or $TmF_3$ exhibits green light emission and afterglow and Eu or $EuF_3$ exhibits red light emission and afterglow. In the following description, the ZnS semiconductor doped with Tb, for example, is indicated as 'ZnS:Tb'.

With this technique, the liquid phase reaction exploiting the co-precipitation is used for doping the II–VI semiconductors with the above-mentioned activator. The liquid phase reaction exploiting co-precipitation is such a reaction in which, in synthesizing a II–VI semiconductor in a pre-set solvent, a salt having atoms operating as an activator is allowed to co-exist in the reaction system. The activator doped at this time need not be composed of a sole atom sort, but may also be composed of plural atom sorts, as described above.

Specifically, for manufacturing ZnS:Mn in which Mn is used as an activator, there occurs a liquid phase reaction indicated by the following chemical formula:

$(CH_3COO)_2/ZnCH_3OH+(CH_3COO)_2Mn/CH_3OH+Na_2S/H_2O \rightarrow ZnS:Mn+2CH_3COONa$ For producing ZnS:Cu,Al, among the II–VI group semiconductors doped with plural sorts of the activators, there occurs a liquid phase reaction according to the following chemical formula (2):

$(CH_3COO_2)Zn/CH_3OH + Cu(CH_3COO)_2/CH_3OH +$
$Al(NO_3)_3/CH_3OH + Na_2S/H_2O) \rightarrow ZnS: Cu, Al + 2CH3COONa$ (2)

For producing ZnS:Ag,Al, there occurs a liquid phase reaction according to the following chemical formula (3):

$(CH_3COO_2)Zn/CH_3OH + CH_3COOAg/H_2O +$
$Al(NO_3)_3/CH_3OH + Na_2S/H_2O \rightarrow ZnS: Ag, Al + 2CH_3COONa$ (3)

For producing ZnS:Cu,Cl, there occurs a liquid phase reaction according to the following chemical formula (4):

$(CH_3COO)_2Zn/CH_3OH+CuCl/H_2O+Na_2S/H_2O \rightarrow ZnS:Cu,Cl+ 2CH_3COONa$ (4)

For producing ZnS:Ag,Cl, there occurs a liquid phase reaction according to the following chemical formula (5):

$(CH_3COO)_2Zn/CH_3OH+AgCl/H_2O+Na_2S/H_2O \rightarrow ZnS:Ag,Cl+ 2CH_3COONa$ (5)

For doping ZnS with terbium Tb, thulium Tm, europium Eu or fluorine F, as activator, either as an element or a compound, there occurs a liquid phase reaction now explained.

Specifically, for producing ZnS:Tb, there occurs a liquid phase reaction according to the following chemical formula (5):

$(CH_3COO)_2Zn/CH_3OH+(NO_3)_3Tb/CH_3OH+Na_2S/H_2O \rightarrow ZnS: Tb+2CH_3COONa$ (6)

For producing ZnS:TbF$_3$, there occurs a liquid phase reaction according to the following chemical formula (7):

$(CH_3COO)_2Zn/CH_3OH+(NO_3)_3Tb/CH_3OH+3NaF/H_2O+Na_2S/ H_2O \rightarrow ZnS: TbF_3+2CH_3COONa$ (7)

For producing ZnS:Tm, there occurs a liquid phase reaction according to the following chemical formula (8):

$(CH_3COO)_2Zn/CH_3OH+(NO_3)_3Tm/CH_3OH+Na_2S/H_2O \rightarrow ZnS: Tm+2CH_3COONa$ (8)

For producing ZnS:TmF$_3$, there occurs a liquid phase reaction according to the following chemical formula (9):

$(CH_3COO)_2Zn/CH_3OH+(NO_3)_3Tm/CH_3OH+3NaF/H_2O+Na_2S/ H_2O \rightarrow ZnS: TmF_3+2CH_3COONa$ (9)

For producing ZnS:Eu, there occurs a liquid phase reaction according to the following chemical formula (10):

$(CH_3COO)_2Zn/CH_3OH+(NO_3)_3Eu/CH_3OH+Na_2S/H_2O \rightarrow ZnS: Eu+2CH_3COONa$ (10)

For producing ZnS:EuF$_3$, there occurs a liquid phase reaction according to the following chemical formula (11):

$(CH_3COO)_2Zn/CH_3OH+(NO_3)_3Eu/CH_3OH+3NaF/H_2O+Na_2S/ H_2O \rightarrow ZnS: EuF_3+2CH_3COONa$ (11)

In the present technique, the activator is added as a salt to the liquid phase reaction system. The salt including an atom serving as an activator may be enumerated by acetates and nitrates, depending on the atom sorts.

Specifically, if the atom serving as an activator is Mn, Ag or Cu, the activator is preferably added as acetate to the liquid phase reaction system. If the atom serving as an activator is Al, Tb, Tm or Eu, the activator is preferably added as nitrate to the liquid phase reaction system. If Cl is used as an activator, it is preferably added to the liquid phase reaction system as Cl compounds, such as CuCl or AgCl. Also, if F is used as an activator, it is preferably added to the liquid phase reaction system as F compounds, such as NaF.

The light-emitting material according to the present invention can use the above-described liquid phase reaction employing co-precipitation to manufacture the II–VI group semiconductor doped with the activator having the particle size of the order of several nm. Since it is possible with the present technique to set the particle size of the II–VI group semiconductor doped with the activator to approximately several nm, the II–VI group semiconductor not manifesting light emission characteristics in the form of the bulk crystals can be manufactured so as to manifest light emission characteristics. Therefore, the II–VI group semiconductors, doped with the activators, exhibit quantization size effect of confining the excitors and electron-hole pairs in an area of several nm, thus realizing a broad band gap. Thus it becomes possible with the present technique to produce light-emitting materials having superior light absorption and light emission characteristics.

In the technique of the present invention, an organic acid is added to the reaction system of the liquid phase reaction having a co-precipitation product. The organic acid may be exemplified by acrylic acid and methacrylic acid. The organic acid, added to the reaction system of the liquid phase reaction, is polymerized to give a high-molecular organic acid which is combined with the II–VI group semiconductors in the light-emitting material. That is, in the above example, the organic acid is polymerized to give a high-molecular organic acid which is combined with zinc sulfide.

In the present technique, the activator can be uniformly dispersed in the II–VI group semiconductor by adding the organic acid to the above reaction system. That is, by adding the organic acid to the reaction system, the light-emitting material can be produced in which molecules of the activator doped in the II–VI group semiconductor are dispersed uniformly and independently of one another. That is, in the above-described example, the light-emitting material can be produced in such a manner that molecules of the activator doped in zinc sulfide are dispersed uniformly and independently of one another.

Thus, the light-emitting material, thus manufactured, has an improved light emitting intensity because the energy from the excited activator operates effectively. That is, with the light-emitting material manufactured by the inventive technique, the light emitting intensity is improved, with the particle size being of the order of several nm. Thus, with the present invention, the light-emitting material can be produced which exhibits strong light emission even under a low voltage.

Also, with the inventive technique, the added organic acid is polymerized to give a high molecular material which is chemically combined with the II–VI group semiconductors. Thus, with the light-emitting material, thus manufactured, part of the energy required for light emission is furnished from the organic acid which turned into the high molecular material. Thus, with the inventive technique, a light-emitting material with improved light emitting strength can be manufactured by adding the organic acid to the liquid phase reaction system. If the organic acid is added in a larger quantity, the intensity of light emission can be improved further.

Moreover, if added to the liquid phase reaction system and turned into the high molecular material, the organic acid itself comes to have light emission characteristics. Thus, the light-emitting material manufactured has not only the light emission ascribable to the activator but also that ascribable to the organic acid turned into the high-molecular material. Thus, with the inventive technique, a light-emitting material can be produced which has further improved light emission characteristics.

On the other hand, with the manufacturing method for the light-emitting material according to the present invention, the high-molecular organic acid or polystyrene may also be added after the end of the liquid phase reaction, instead of adding the organic acid during liquid phase reaction. The high molecular organic acid may be enumerated by polyacrylic acid and polymethacrylic acid. For adding the high-molecular organic acid or polystyrene in the above technique, a reaction product obtained by the above-mentioned liquid phase reaction can be dried and molded and the organic acid or polystyrene can then be supplied dropwise to the molded product.

By adding the high molecular organic acid or polystyrene after the end of the liquid phase reaction, the surface of particles of the II–VI group semiconductor doped with the activator is coated with the high molecular organic acid or polystyrene. Thus, the high molecular organic acid or polystyrene reduces the defects on the particle surface to reduce non-radiation relaxation. Thus, in this case, a light-emitting material having improved light emission characteristics can be manufactured by the inventive technique.

The high molecular organic acid or polystyrene is chemically combined with the II–VI group semiconductor. Thus, with the manufactured light-emitting material, part of the energy required for light emission is furnished from the high molecular organic acid or polystyrene. Therefore, with the inventive technique, the light-emitting material having improved light emission intensity can be manufactured by adding the high molecular organic acid or polystyrene after the end of the liquid phase reaction. Moreover, the light emission intensity becomes higher the larger the amount of addition of the high molecular organic acid or polystyrene.

Moreover, the high molecular organic acid itself has light emitting characteristics. Therefore, the manufactured light-emitting material has light emission proper to the high molecular organic acid in addition to that proper to the activator. Thus it is possible with the inventive technique to produce the light-emitting material having improved light emission intensity.

EXAMPLE

A light-emitting material was produced using a manufacturing method for a light-emitting material according to the present invention. In the present Example, zinc sulfide ZnS and manganese Mn were used as the II–VI group semiconductor and as the activator, respectively. In this case, manganese is doped as divalent cation to zinc sulfide. The manufacturing process for ZnS:Mn is hereinafter explained.

150 ml of a solution of zinc acetate in methanol (0.133 mol/l) and 25 ml of a solution of manganese acetate in methanol (0.008 mol/l) were first mixed and agitated by a magnetic stirrer for ten minutes to produce a mixed solution.

The above-mentioned mixed solution was then added to 60 ml of the aqueous solution of sodium sulfide (0.4 mol/l) and agitated by the magnetic stirrer. The resulting mixture was then agitated vigorously for further 15 minutes.

To this mixed solution was added 50 ml of acrylic or methacrylic acid and the resulting mixture was agitated vigorously for 15 minutes.

Then, using a centrifugal separator, centrifugation was carried out for 20 minutes at 4000 rpm to give precipitates which were dried by blowing air at 50° C. for 24 hours. The solid product, thus dried by blowing air, was crushed to produce ZnS:Mn.

Figure 1:
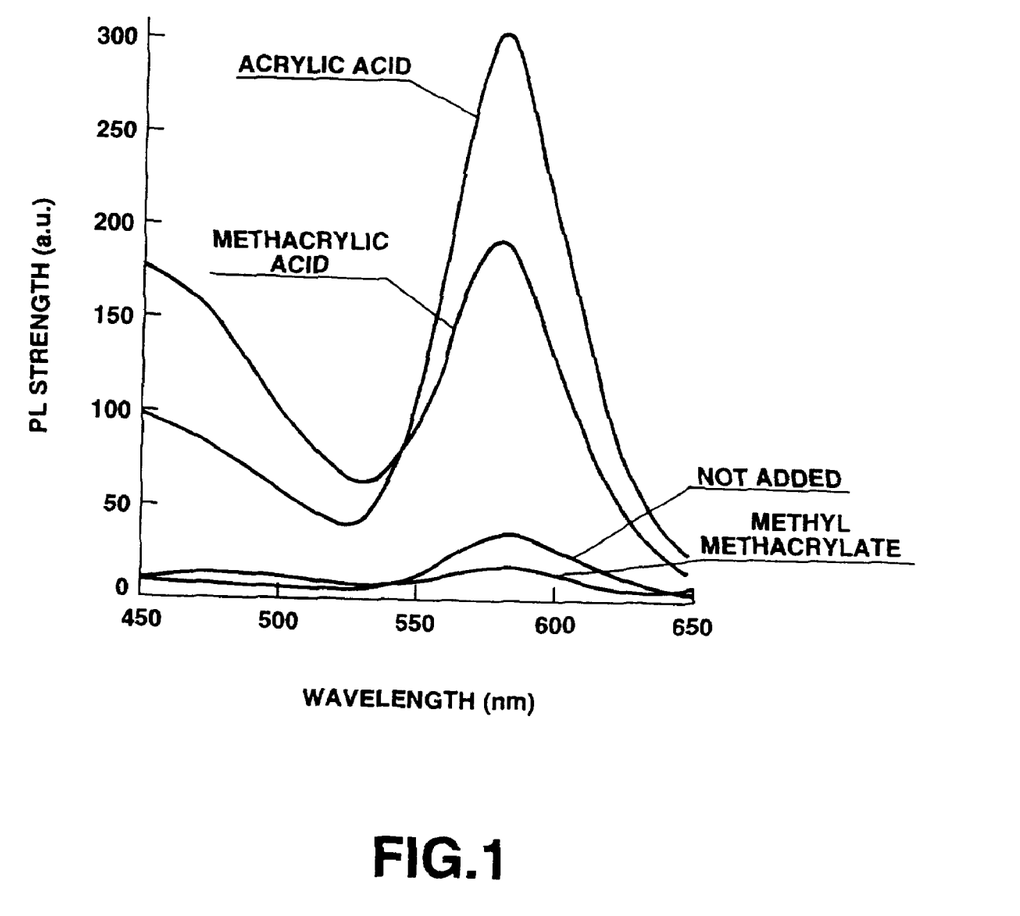
FIG. 1 is a graph for illustrating light emission characteristics on addition of acrylic acid or methacrylic acid.

For determining the light emission characteristics in ZnS:Mn, thus produced, its photoluminescence strength (PL strength) was measured. For comparison, a sample not admixed with an organic acid and a sample admixed with methyl methacrylate in place of an organic acid were manufactured. FIG. 1 shows measured results of the PL strength of each of these samples. In FIG. 1, the ordinate and the abscissa denote the PL strength and the wavelength, respectively.

As may be seen from FIG. 1, a large peak is found on addition of acrylic acid or methacrylic acid in distinction from the case of non-addition of these acids. Conversely, if methyl methacrylate is added, there is scarcely any peak observed in the vicinity of approximately 580 nm. This peak at approximately 580 nm denotes light emission attributable to Mn ions. Thus, with the manufacturing method for light-emitting material according to the present invention, the light emission ascribable to Mn ions can be improved in intensity by addition of an organic acid to the liquid reaction system.

Although not shown in FIG. 1, there is observed a peak in the vicinity of approximately 430 nm with the light-emitting material manufactured by the technique of the present invention. This is obvious from the increasing PL strength observed in the vicinity of 450 nm shown in FIG. 1. This peak at approximately 430 nm is thought to be ascribable to acrylic acid. Specifically, the added acrylic acid possibly is polymerized to polyacrylic acid which is thought to be responsible for the light emission at approximately 430 nm. Our further researches have revealed that organic acids, represented first of all by polyacrylic acid, manifest light emission characteristics at approximately 430 nm, even if used alone. From this it may be said that organic acids, such as polyacrylic acid, can increase light emission strength of the light-emitting material in its entirety.

Thus, the light-emitting material, manufactured as described above, can exhibit light emission characteristics at approximately 430 nm in addition to the light emission characteristics at approximately 580 nm. Therefore, this light-emitting material in its entirety exhibits superior light emission strength. Meanwhile, these light emission characteristics are observed not only in case of using acrylic acid as the organic acid, but also in case of using methacrylic acid or the like as the organic acid. If methacrylic acid is used, polymethacrylic acid is produced, by which light emission is observed in the vicinity of approximately 430 nm.

Figure 2:
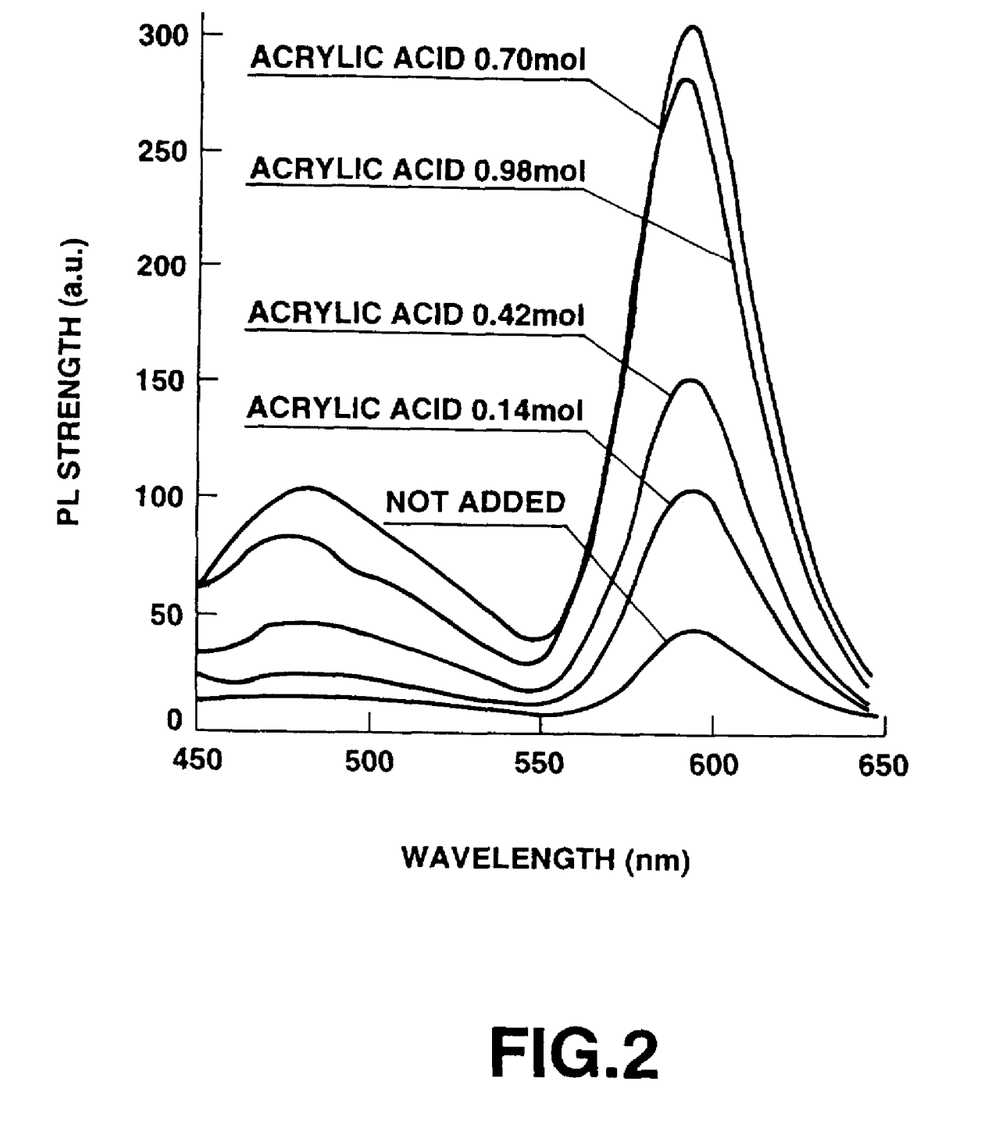
FIG. 2 is a graph showing the relation between the amount of addition of organic acid and light emission intensity.

It has been found that, with the light-emitting material manufactured by the inventive technique, light emission strength at approximately 580 nm ascribable to Mn ions is changed in dependence upon the amount of addition of the organic acid, as shown in FIG. 2. In FIG. 2, the ordinate and the abscissa denote the PL strength and the wavelength, respectively. In this figure, the amount of addition of acrylic acid is given as a value for the concentration of added Mn ions equal to 1.0 mol %. If, with the addition of 1.0 mol % of Mn ions, the amount of addition of acrylic acid is on the order of approximately 0.7 mol, the light emission strength of approximately 580 nm ascribable to Mn ions is approximately ten times as high as that in case on non-addition of acrylic acid.

Although not shown in FIG. 2, the light emission strength of approximately 430 nm ascribable to the organic acid is also changed with the amount of addition of the organic acid. This is evident from the differential increase in the light emission strength observed in the vicinity of 450 nm in FIG. 2. In this case, the light emission strength at approximately 430 nm is increased if the amount of addition of acrylic acid is 0.7 mol. From this it is seen that, if, with the amount of addition of Mn ions of 1.0 mol %, the amount of addition of acrylic acid is approximately 0.7 mol, the light emission strength in its entirety is desirably increased.

Figure 3:
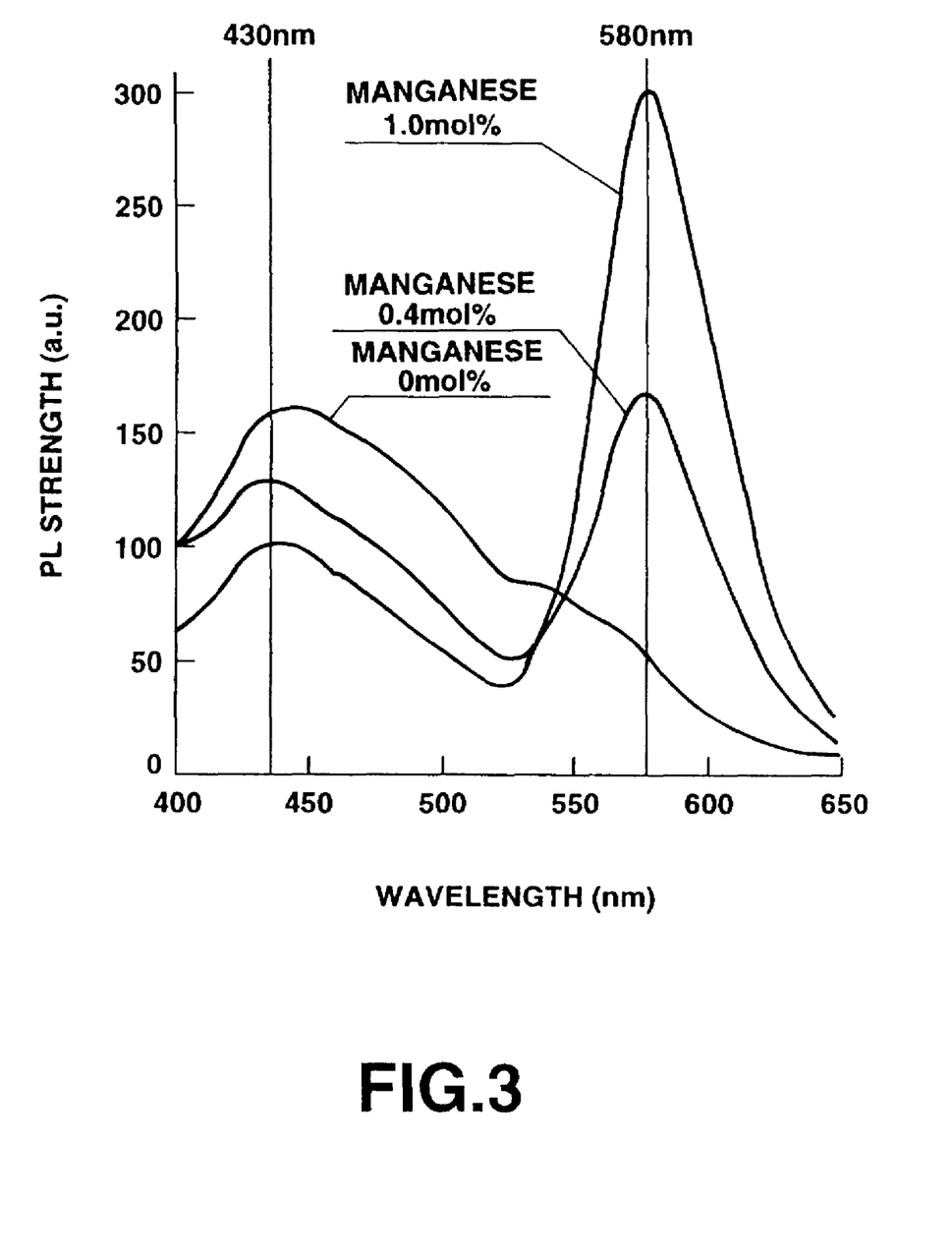
FIG. 3 is a graph showing the relation between the amount of addition of an activator and light emission characteristics.

Also, with the light-emitting material manufactured by the inventive technique, the light emission strength is varied depending on the concentration of Mn ions, as shown in FIG. 3, in which the ordinate and the abscissa denote the PL strength and the wavelength, respectively. In each sample shown in FIG. 3, 0.7 mol of acrylic acid was added as the organic acid. It is seen from FIG. 3 that the light emission strength of approximately 580 nm ascribable to Mn ions is increased with the increasing concentration of Mn ions. Conversely, with the present light-emitting material, the light emission strength of approximately 430 nm ascribable to the organic acid is decreased with the increasing Mn ion concentration.

It is seen from FIG. 3 that the light emission strength of approximately 580 nm relative to the light emission strength of the entire light-emitting material is increased. Stated differently, if the doping amount of Mn ions is increased, the relative light emission strength of approximately 580 nm is increased. From this it may be suggested that, in this light-emitting material, the energy for light emission is being moved from the organic acid to Mn ions.

That is, if the doping quantity of Mn ions is increased, the organic acid furnishes to the Mn ions the energy for light emission of the increased Mn ions. Thus, the energy set aside for the organic acid to emit light is decreased to decrease light emission at approximately 430 nm. Consequently, the light emission strength of approximately 430 nm ascribable to the organic acid is decreased with an increased doping quantity of Mn ions.

Measurement of the above-mentioned light-emitting material by IR absorption spectrum demonstrated a peak due to the oscillations by the organic acid and a peak ascribable to S—O bonds. This suggests that the organic acid added in the light-emitting material manufactured by the inventive technique is bonded to ZnS:Mn by S—O bonds, and consequently that the organic acid is furnishing the energy for light emission by Mn ions.

Figure 4:
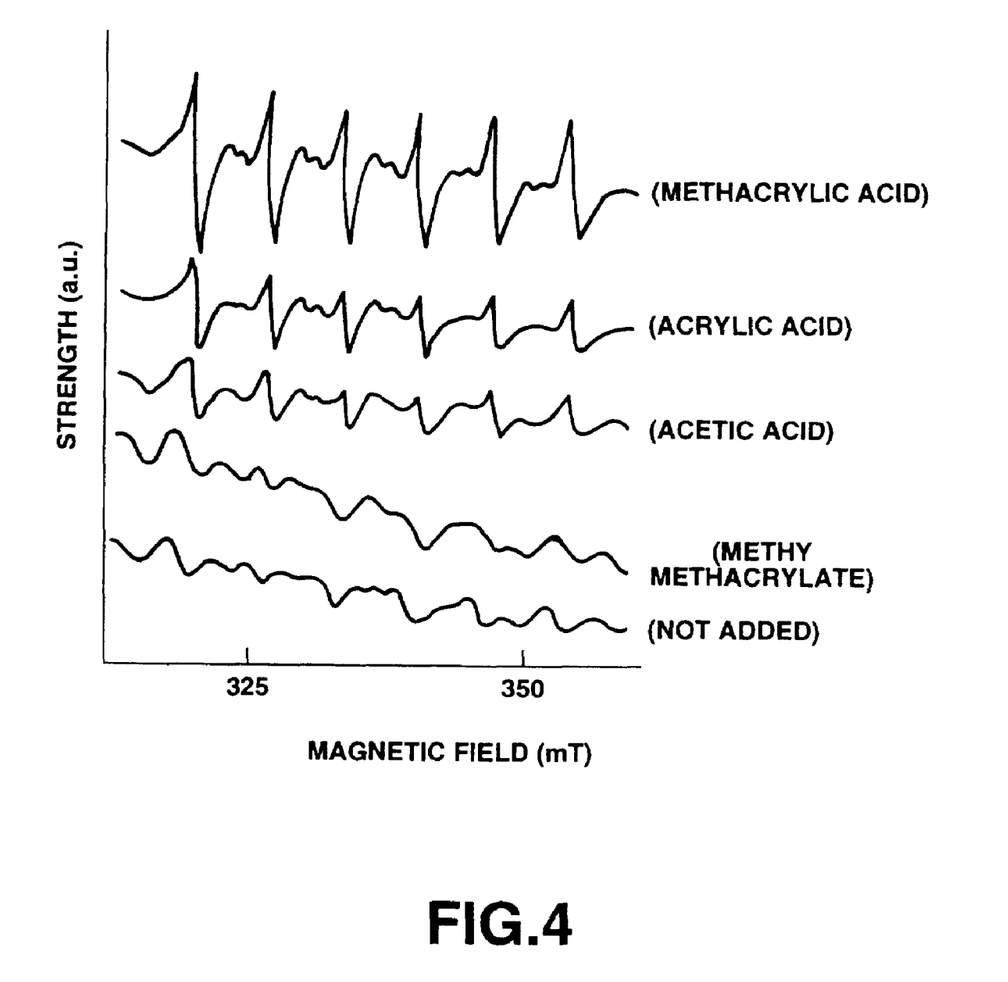
FIG. 4 is a graph for illustrating the state of distribution of the activator admixed with organic acid.

In the ZnS:Mn, manufactured as described above, the state of distribution of Mn ions was measured using the electron spin resonance method. The results of measurement are shown in FIG. 4, in which the ordinate and the abscissa denote the strength and the magnetic field, respectively. For comparison, a sample added to with acetic acid, as an organic acid, a sample added to with methyl methacrylate and a sample not added to with acetic acid nor with methyl methacrylate were fabricated in place of samples added to with acrylic or methacrylic acid.

It is seen from FIG. 4 that, if acrylic acid or methacrylic acid is added, six sharp peaks are observed. A similarly sharp peak is observed on addition of acetic acid. Conversely, on addition or without addition of methyl methacrylate, only broad peaks are observed in place of sharp peaks.

The reason that broad peaks are observed in the results of measurement employing the electron spin resonance method, as in the case of addition or non-addition of methyl methacrylate, is possibly that the spin exchange interaction occurs because the Mn ions are not doped in uniformly dispersed state. On the other hand, the reason the six sharp peaks are observed is that Mn ions are uniformly doped in ZnS, that is that the Mn ions are uniformly dispersed and exchanged with Zn ions to obstruct the manifestation of the spin exchange effect.

Thus, with the manufacturing method for manufacturing the light-emitting material according to the present invention, it is seen that the Mn ions can be doped in a uniformly dispersed state by adding the organic acid to the liquid phase reaction system during the liquid phase reaction. If the organic acid is acrylic acid or methacrylic acid, the six peaks become more sharp thus demonstrating that the Mn ions have been doped more uniformly.

If, in ZnS:Mn, Mn ions are doped in a uniformly dispersed state in ZnS, the energy of the excited Mn ions is utilized efficiently for light emission. Conversely, if there is any portion in ZnS:Mn in which Mn ions are not dispersed uniformly but doped in a locally concentrated state, the light emission strength is lowered. This is due to the fact that the energy of the excited Mn ions is used up for exciting near-by Mn ions thus decreasing the energy usable for light emission.

With ZnS:Mn manufactured by the inventive technique, since the Mn ions can be doped in a uniformly dispersed state, the energy proper to the excited Mn ions can be used efficiently for light emission without loss.

In the ZnS:Mn, thus manufactured, the crystal grain size, as analysed by an electron microscope based on the spreading of the X-ray diffraction peak, was found to be of the order of 2 to 3 mm. With this technique, the amount of addition of acrylic or methacrylic acid can be varied to adjust the crystal grain size. Specifically, if methacrylic acid is added, the crystal grain size is approximately 2.7 nm, approximately 2.5 nm and approximately 2.3 nm for the amounts of addition of methacrylic acid of 10 ml, 30 ml and 50 ml, respectively.

Thus, in fabricating ZnS:Mn according to the present invention, it is seen that ZnS:Mn has a particle size of the order of several nm and is superior in light emission strength. Therefore, the light-emitting material manufactured by the application of the inventive technique can be excited into photoluminescence at a lower voltage than in the conventional technique. Thus, the present light-emitting material can be used with advantage for a thin flat display in which a low-voltage electron beam is used.

According to the present invention, the II–VI group semiconductors having the nano-crystal structure, formerly not possible to produce, can be produced efficiently in stability. Moreover, the present invention is not limited to the manufacture of ZnS:Mn as described above. That is, a light-emitting material of the type sufficient as the light-emitting material for a thin type display can be manufactured in accordance with the teaching of the present invention.

In the following embodiment, activators other than Mn are used.

As a first example, zinc sulfide was used as the II–VI group semiconductor and Cu and Al are used as activator in the manufacture of ZnS:Cu,Al.

First, 150 ml of a solution of zinc acetate in methanol (0.133 mol/l), 0.5 ml of a solution of copper acetate in methanol (0.008 mol/l) and 1.0 ml of aluminum nitrate in methanol (0.008 mol/l) were mixed and stirred for ten minutes to give a mixed solution.

The above mixed solution was added to 60 ml of an aqueous solution of sodium sulfide stirred by a magnetic stirrer. The resulting product was agitated further vigorously for 20 minutes.

50 ml of acrylic acid or methacrylic acid were added to this mixed solution and agitated for 15 minutes. The reaction shown by the chemical formula 12:

ZnS:Cu,Al+CH$_2$CHCOOH→(CH$_2$CHCOOH)ZnS:Cu,Al  (12)

is occurring at this time, in which the organic acid used is acrylic acid.

Then, centrifugation was carried out at 4000 rpm for 20 minutes using a centrifugal separator. The centrifuged precipitate was dried by blowing air at 50° C. for 20 minutes. The solid product, obtained on drying with air blowing, was pulverized to produce ZnS:Cu,Al.

Although the foregoing description has been made of the case of manufacturing ZnS:Cu,Al by mixing the solutions in the above ratio, it is sufficient if the solution of copper acetate in methanol was added in an amount of 0.25 to 5 ml. On the other hand, the solution of aluminum acetate in methanol is desirably added in an amount of 0.5 to 10 ml. That is, Cu is desirably added in a proportion of 0.01 mol % to 0.2 mol % to 1 mol of Zn, while Al is desirably added in a proportion of 0.02 mol % to 0.4 mol % to 1 mol of Zn.

Next, the case of using zinc sulfide as the II–VI group semiconductor and Cu, Cl was used as an activator to manufacture ZnS:Cu,Cl. This reaction was carried out in its entirety in a nitrogen atmosphere.

First, 150 ml of a solution of zinc acetate in methanol (0.133 mol/l) and 0.5 ml of an aqueous solution of cuprous chloride (0.008 mol/l) were mixed and agitated for 10 minutes by a magnetic stirrer to obtain a mixed solution.

The above mixed solution was then added to 60 ml of an aqueous solution of sodium sulfide agitated by the magnetic stirrer. The resulting mixture was further agitated for 20 minutes.

To the resulting mixture were added 50 ml of acrylic acid or methacrylic acid and agitated for 15 minutes. The reaction shown by the chemical formula 13:

$$ZnS:Cu,Cl+CH_2CHCOOH \rightarrow (CH_2CHCOOH)ZnS:Cu,Al \quad (13)$$

is occurring at this time, in which the organic acid used is acrylic acid.

Then, centrifugation was carried out at 4000 rpm for 20 minutes using a centrifugal separator. The centrifuged precipitate was dried by blowing air at 50° C. for 20 minutes. The solid product obtained on drying by air blowing was pulverized to produce ZnS:Cu,Cl.

Although the solutions are mixed in the above proportions in the above description to manufacture ZnS:Cu,Cl, the aqueous solution of cuprous chloride is desirably added in a range of from 0.25 to 5 ml. That is, Cu, Cl is desirably added in a proportion of 0.01 mol % to 0.2 mol % to 1 mol of Zn.

Next, an example is explained in which zinc sulfide is used as the II–VI group semiconductor and Ag and Al are used as activator in the manufacture of ZnS:Ag,Al.

First, 150 ml of a solution of zinc acetate in methanol (0.133 mol/l), 0.5 ml of a solution of copper acetate in methanol (0.008 mol/l) and 1.0 ml of aluminum nitrate in methanol (0.008 mol/l) were mixed and stirred for ten minutes by a magnetic stirrer to give a mixed solution.

The above mixed solution was added to 60 ml of an aqueous solution of sodium sulfide (0.4 mol/l) stirred by a magnetic stirrer. The resulting product was agitated further vigorously for 20 minutes.

50 ml of acrylic acid or methacrylic acid were added to this mixed solution and agitated for 15 minutes. The reaction shown by the chemical formula 14:

$$ZnS:Ag,Al+CH_2CHCOOH \rightarrow (CH_2CHCOOH)ZnS:Ag,Al \quad (14)$$

is occurring at this time, in which the organic acid used is acrylic acid.

Then, centrifugation was carried out at 4000 rpm for 20 minutes using a centrifugal separator. The centrifuged precipitate was dried by blowing air at 50° C. for 20 minutes. The solid product, obtained on drying with air blowing, was pulverized to produce ZnS:Ag,Al.

Although the foregoing description has been made of the case of manufacturing ZnS:Ag,Al by mixing the solutions in the above ratio, it is sufficient if the solution of copper acetate in methanol was added in an amount of 0.25 to 5 ml. On the other hand, the solution of aluminum acetate in methanol is desirably added in an amount of 0.5 to 10 ml. That is, Cu is desirably added in a proportion of 0.01 mol % to 0.2 mol % to 1 mol of Zn, while Al is desirably added in a proportion of 0.02 mol % to 0.4 mol % to 1 mol of Zn.

Further, an example is explained in which zinc sulfide is used as the II–VI group semiconductor and Ag, Cl are used as activator in the manufacture of ZnS:Ag,Cl.

First, 150 ml of a solution of zinc acetate in methanol (0.133 mol/l) and 0.5 ml of an aqueous solution of silver chloride (0.008 mol/l) were mixed and stirred for ten minutes by a magnetic stirrer to give mixed solution.

The above mixed solution was added to 60 ml of an aqueous solution of sodium sulfide (0.4 mol/l) stirred by a magnetic stirrer. The resulting product was agitated further vigorously for 20 minutes.

50 ml of acrylic acid or methacrylic acid were added to this mixed solution and agitated for 15 minutes. The reaction shown by the chemical formula 15:

$$ZnS:Ag,Al+CH_2CHCOOH \rightarrow (CH_2CHCOOH)ZnS:Ag,Al \quad (15)$$

is occurring at this time, in which the organic acid used is acrylic acid.

Then, centrifugation was carried out at 4000 rpm for 20 minutes using a centrifugal separator. The centrifuged precipitate was dried by blowing air at 50° C. for 24 hours. The solid product, obtained on drying with air blowing, was pulverized to produce ZnS:Ag,Cl.

The foregoing description has been made of the case of manufacturing ZnS:Ag,Cl by mixing the solutions in the above ratio. It is sufficient if the aqueous solution of copper acetate is added in an amount of 0.25 to 5 ml. That is, Ag,Cl was desirably added in a proportion of 0.01 mol % to 0.2 mol % to 1 mol of Zn.

ZnS:Cu,Al, ZnS:Cu,Cl, ZnS:Ag,Al and ZnS:Ag,Cl, manufactured as described above, were analysed on the basis of the spreading of the X-ray diffraction peak on a transmission electron microscope. In these analyses, the particle size was found to be of the order of 3 nm.

Figure 5:
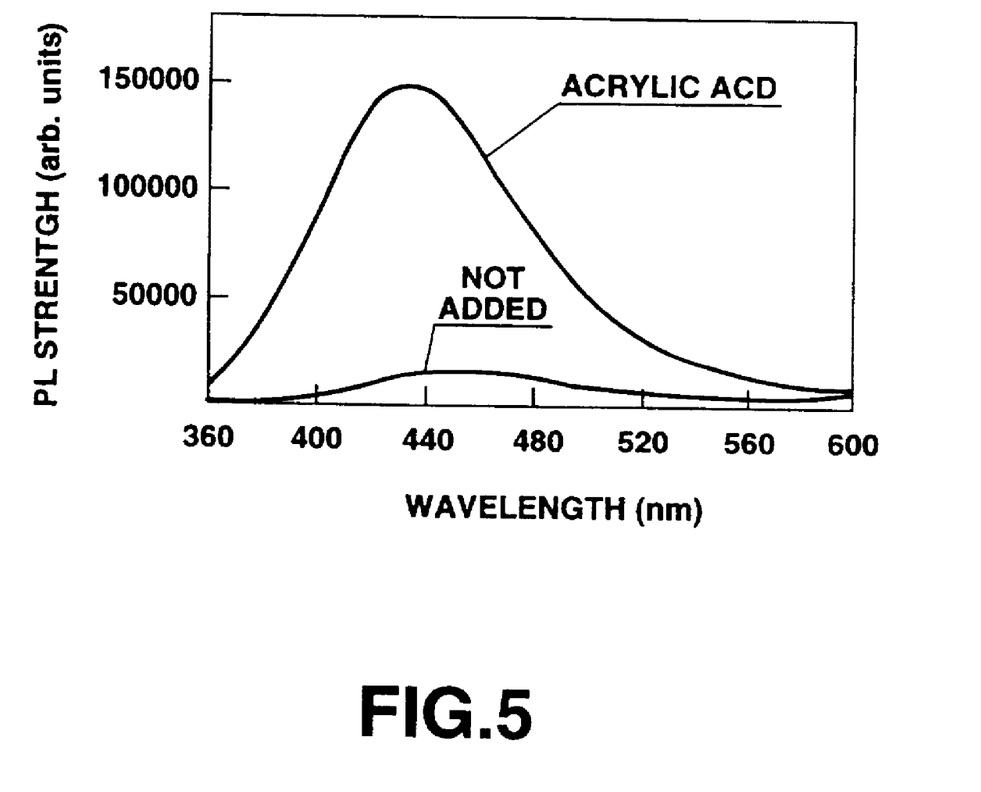
FIG. 5 is a graph for illustrating light emission characteristics on addition of acrylic acid.

Also, measurement was made of the photoluminescence strength (PL strength) of the above-mentioned ZnS:Ag,Al. For comparison, a sample was manufactured without adding the organic acid and measurement was made of the PL strength thereof. The results of measurement shown in FIG. 5 were obtained on the PL strength of each sample. In FIG. 5, the ordinate and the abscissa denote the PL strength and the wavelength, respectively.

It is seen from FIG. 5 that the nano-crystal Zn:Ag,Al was brighter by approximately 10 times than the sample not added with the organic acid during the liquid phase reaction. This applied for ZnS:Cu, Al, ZnS:Cu,Cl and ZnS:Ag,Cl.

Thus, in fabricating ZnS:Cu,Al, ZnS:Cu,Cl and ZnS:Ag, Al and ZnS:Ag,Cl according to the present invention, it is seen that ZnS:Mn has a particle size of the order of several nm and is superior in light emission strength. Therefore, the light-emitting material manufactured by the application of the inventive technique can be excited into photoluminescence at a lower voltage than in the conventional technique. Thus, the present light-emitting material can be used with advantage for a thin flat display in which a low-voltage electron beam is used. The present light-emitting material can, of course, be used with advantage for a high-definition cathode ray tube (CRT) or ELD.

Further, an example is explained in which zinc sulfide is used as the II–VI group semiconductor and Tb is used as activator in the manufacture of ZnS:Ag,Cl.

First, 150 ml of a solution of zinc acetate in methanol (0.133 mol/l) and 25 ml of a solution of terbium nitrate in methanol (0.008 mol/l) were mixed and stirred for ten minutes by a magnetic stirrer to give mixed solution.

The above mixed solution was added to 60 ml of an aqueous solution of sodium sulfide (0.4 mol/l) stirred by a magnetic stirrer. The resulting product was agitated further vigorously for 20 minutes.

50 ml of acrylic acid or methacrylic acid were added to this mixed solution and agitated for 15 minutes. The reaction shown by the chemical formula 16:

$$ZnS:Tb+CH_2CHCOOH \rightarrow (CH_2CHCOOH)ZnS:Tb \quad (16)$$

is occurring at this time, in which the organic acid used is acrylic acid.

Then, centrifugation was carried out at 4000 rpm for 20 minutes using a centrifugal separator. The centrifuged precipitate was dried by blowing air at 50° C. for 24 hours. The solid product, obtained on drying with air blowing, was pulverized to produce ZnS:Tb.

Further, an example is explained in which zinc sulfide is used as the II–VI group semiconductor and Tb and F are used as activator in the manufacture of ZnS:TbF$_3$.

First, 150 ml of a solution of zinc acetate in methanol (0.133 mol/l), 25 ml of a solution of terbium nitrate in methanol (0.008 mol/l) and 25 ml of an aqueous solution of sodium fluoride (0.024 mol/l) were mixed and stirred for ten minutes by a magnetic stirrer to give mixed solution.

The above mixed solution was added to 60 ml of an aqueous solution of sodium sulfide (0.4 mol/l) stirred by a magnetic stirrer. The resulting product was agitated further vigorously for 20 minutes.

50 ml of acrylic acid or methacrylic acid were added to this mixed solution and agitated for 15 minutes. The reaction shown by the chemical formula 17:

$$ZnS:TbF_3+CH_2CHCOOH \rightarrow (CH_2CHCOOH)ZnS:TbF_3 \quad (17)$$

is occurring at this time, in which the organic acid used is acrylic acid.

Then, centrifugation was carried out at 4000 rpm for 20 minutes using a centrifugal separator. The centrifuged precipitate was dried by blowing air at 50° C. for 24 hours. The solid product, obtained on drying with air blowing, was pulverized to produce ZnS:TbF$_3$.

Further, an example is explained in which zinc sulfide is used as the II–VI group semiconductor and Tm is used as activator in the manufacture of ZnS:Tm.

First, 150 ml of a solution of zinc acetate in methanol (0.133 mol/l) and 25 ml of a solution of thulium nitrate in methanol (0.008 mol/l) were mixed and stirred for ten minutes by a magnetic stirrer to give mixed solution.

The above mixed solution was added to 60 ml of an aqueous solution of sodium sulfide (0.4 mol/l) stirred by a magnetic stirrer. The resulting product was agitated further vigorously for 20 minutes.

50 ml of acrylic acid or methacrylic acid were added to this mixed solution and agitated for 15 minutes. The reaction shown by the chemical formula 18:

$$ZnS:Tm+CH_2CHCOOH \rightarrow (CH_2CHCOOH)ZnS:Tm \quad (18)$$

is occurring at this time, in which the organic acid used is acrylic acid.

Then, centrifugation was carried out at 4000 rpm for 20 minutes using a centrifugal separator. The centrifuged precipitate was dried by blowing air at 50° C. for 24 hours. The solid product, obtained on drying with air blowing, was pulverized to produce ZnS:Tm.

Further, an example is explained in which zinc sulfide is used as the II–VI group semiconductor and Tm, F are used as activator in the manufacture of ZnS:TbF$_3$.

First, 150 ml of a solution of zinc acetate in methanol (0.133 mol/l), 25 ml of a solution of thulium nitrate in methanol (0.008 mol/l) and 25 ml of an aqueous solution of sodium fluoride (0.024 mol/l) were mixed and stirred for ten minutes by a magnetic stirrer to give mixed solution.

The above mixed solution was added to 60 ml of an aqueous solution of sodium sulfide (0.4 mol/l) stirred by a magnetic stirrer. The resulting product was agitated further vigorously for 20 minutes.

50 ml of acrylic acid or methacrylic acid were added to this mixed solution and agitated for 15 minutes. The reaction shown by the chemical formula 19:

$$ZnS:TmF_3+CH_2CHCOOH \rightarrow (CH_2CHCOOH)ZnS:TmF_3 \quad (19)$$

is occurring at this time, in which the organic acid used is acrylic acid.

Then, centrifugation was carried out at 4000 rpm for 20 minutes using a centrifugal separator. The centrifuged precipitate was dried by blowing air at 50° C. for 24 hours. The solid product, obtained on drying with air blowing, was pulverized to produce ZnS:TmF$_3$.

Further, an example is explained in which zinc sulfide is used as the II–VI group semiconductor and Eu is used as activator in the manufacture of ZnS:Eu.

First, 150 ml of a solution of zinc acetate in methanol (0.133 mol/l) and 25 ml of a solution of europium nitrate in methanol (0.008 mol/l) were mixed and stirred for ten minutes by a magnetic stirrer to give mixed solution.

The above mixed solution was added to 60 ml of an aqueous solution of sodium sulfide (0.4 mol/l) stirred by a magnetic stirrer. The resulting product was agitated further vigorously for 20 minutes.

50 ml of acrylic acid or methacrylic acid were added to this mixed solution and agitated for 15 minutes. The reaction shown by the chemical formula 20:

$$ZnS:Eu+CH_2CHCOOH \rightarrow (CH_2CHCOOH)ZnS:Eu \quad (20)$$

is occurring at this time, in which the organic acid used is acrylic acid.

Then, centrifugation was carried out at 4000 rpm for 20 minutes using a centrifugal separator. The centrifugated precipitate was dried by blowing air at 50° C. for 24 hours. The solid product, obtained on drying with air blowing, was pulverized to produce ZnS:Eu.

Further, an example is explained in which zinc sulfide is used as the II–VI group semiconductor and Eu, F are used as activator in the manufacture of ZnS:EuF$_3$.

First, 150 ml of a solution of zinc acetate in methanol (0.133 mol/l), 25 ml of a solution of europium nitrate in methanol (0.008 mol/l) and 25 ml of an aqueous solution of sodium fluoride (0.024 mol/l) were mixed and stirred for ten minutes by a magnetic stirrer to give mixed solution.

The above mixed solution was added to 60 ml of an aqueous solution of sodium sulfide (0.4 mol/l) stirred by a magnetic stirrer. The resulting product was agitated further vigorously for 20 minutes.

50 ml of acrylic acid or methacrylic acid were added to this mixed solution and agitated for 15 minutes. The reaction shown by the chemical formula 21:

$$ZnS:EuF_3+CH_2CHCOOH \rightarrow (CH_2CHCOOH)ZnS:EuF_3 \quad (21)$$

is occurring at this time, in which the organic acid used is acrylic acid.

Then, centrifugation was carried out at 4000 rpm for 20 minutes using a centrifugal separator. The centrifugated precipitate was dried by blowing air at 50° C. for 24 hours. The solid product, obtained on drying with air blowing, was pulverized to produce ZnS:EuF$_3$.

ZnS:Tb, ZnS:TbF$_3$, ZnS:Tm, ZnS:TmF$_3$, ZnS:Eu and ZnS:EuF$_3$, manufactured as described above, were analysed on the basis of the spreading of the X-ray diffraction peak on a transmission electron microscope. In these analyses, the particle size was found to be of the order of 3 nm.

In accordance with the present invention, ZnS:Tb, ZnS:TbF$_3$, ZnS:Tm, ZnS:TmF$_3$, ZnS:Eu, and ZnS:EuF$_3$ were actually prepared. These had the particle size approximately equal to several $\mu$m. From this it is seen that the light-emitting material manufactured by the inventive technique can generate electroluminescence at a lower voltage than in the conventional practice. The light-emitting material of the present invention can be conveniently used for a thin type flat display employing an electron beam of a low voltage, in particular the FED. The light-emitting material can, of course, be used for high-definition CRT or ELD.

What is claimed is:

1. A method for manufacturing a light-emitting material comprising:

forming a II–VI group semiconductor, doped with an activator, by a liquid phase reaction having a co-precipitation product;

adding a polymerizable organic acid to the liquid phase reaction system during the liquid phase reaction; and polymerizing said organic acid.

2. The manufacturing method as claimed in claim 1 wherein said organic acid is selected from acrylic acid and methacrylic acid.

3. The manufacturing method as claimed in claim 1 wherein said activator is comprised of manganese and wherein said II–VI group semiconductor is zinc sulfide.

4. The manufacturing method as claimed in claim 3 wherein, in said liquid phase reaction, manganese acetate and zinc acetate are reacted along with sodium sulfide in a solvent for forming zinc sulfide doped with manganese.

5. The manufacturing method as claimed in claim 1 wherein said activator is comprised of copper and chlorine and wherein said II–VI group semiconductor is zinc sulfide.

6. The manufacturing method as claimed in claim 5 wherein, in said liquid phase reaction, cuprous chloride and zinc acetate are reacted in a solvent along with sodium sulfide in a nitrogen atmosphere for forming zinc sulfide doped with copper and chlorine.

7. The manufacturing method as claimed in claim 1 wherein said activator is comprised of copper and aluminum and wherein said II–VI group semiconductor is zinc sulfide.

8. The manufacturing method as claimed in claim 7 wherein, in said liquid phase reaction, copper acetate, aluminum nitrate and zinc acetate are reacted in a solvent along with sodium sulfide for forming zinc sulfide doped with copper and aluminum.

9. The manufacturing method as claimed in claim 1 wherein said activator is comprised of silver and chlorine and wherein said II–VI group semiconductor is zinc sulfide.

10. The manufacturing method as claimed in claim 7 wherein, in said liquid phase reaction, silver chloride and zinc acetate are reacted in a solvent along with sodium sulfide for forming zinc sulfide doped with silver and chlorine.

11. The manufacturing method as claimed in claim 1 wherein said activator is comprised of terbium and wherein said II–VI group semiconductor is zinc sulfide.

12. The manufacturing method as claimed in claim 11 wherein, in said liquid phase reaction, terbium nitrate and zinc acetate are reacted in a solvent along with sodium sulfide for forming zinc sulfide doped with terbium.

13. The manufacturing method as claimed in claim 1 wherein said activator is comprised of terbium and fluorine and wherein said II–VI group semiconductor is zinc sulfide.

14. The manufacturing method as claimed in claim 13 wherein, in said liquid phase reaction, terbium nitrate, sodium fluoride and zinc acetate are reacted in a solvent along with sodium sulfide for forming zinc sulfide doped with terbium and fluorine.

15. The manufacturing method as claimed in claim 13 wherein said activator is comprised of thulium and wherein said II–VI group semiconductor is zinc sulfide.

16. The manufacturing method as claimed in claim 15 wherein, in said liquid phase reaction, thulium nitrate and zinc acetate are reacted in a solvent along with sodium sulfide for forming zinc sulfide doped with thulium.

17. The manufacturing method as claimed in claim 1 wherein said activator is comprised of thulium and fluorine and wherein said II–VI group semiconductor is zinc sulfide.

18. The manufacturing method as claimed in claim 17 wherein, in said liquid phase reaction, thulium nitrate, sodium fluoride and zinc acetate are reacted in a solvent along with sodium sulfide for forming zinc sulfide doped with thulium and fluorine.

19. The manufacturing method as claimed in claim 1 wherein said activator is comprised of europium and wherein said II–VI group semiconductor is zinc sulfide.

20. The manufacturing method as claimed in claim 19 wherein, in said liquid phase reaction, europium nitrate and zinc acetate are reacted in a solvent along with sodium sulfide for forming zinc sulfide doped with europium.

21. The manufacturing method as claimed in claim 1 wherein said activator is comprised of europium and fluorine and wherein said II–VI group semiconductor is zinc sulfide.

22. The manufacturing method as claimed in claim 21 wherein, in said liquid phase reaction, europium nitrate, sodium fluoride and zinc acetate are reacted in a solvent along with sodium sulfide for forming zinc sulfide doped with europium and fluorine.

23. A method for manufacturing a light-emitting material comprising:

forming a II–VI group semiconductor, doped with an activator, by a liquid phase reaction having a co-precipitation product;

drying and molding said co-precipitation product; and coating said co-precipitation product using a polymer-containing organic acid or polystyrene after end of said liquid phase reaction.

24. The manufacturing method as claimed in claim 23 wherein said activator is comprised of manganese and wherein said II–VI group semiconductor is zinc sulfide.

25. The manufacturing method as claimed in claim 24 wherein, in said liquid phase reaction, manganese acetate and zinc acetate are reacted in a solvent along with sodium sulfide for forming zinc sulfide doped with manganese.

26. The manufacturing method as claimed in claim 23 wherein said high molecular organic acid is at least one selected form the group of polyacrylic acid and polymethacrylic acid.

* * * * *